J. D. TOWER, Jr.
ATTACHMENT FOR STEERING GEAR OF AUTOMOBILES.
APPLICATION FILED MAR. 21, 1912.
1,064,111.  Patented June 10, 1913.
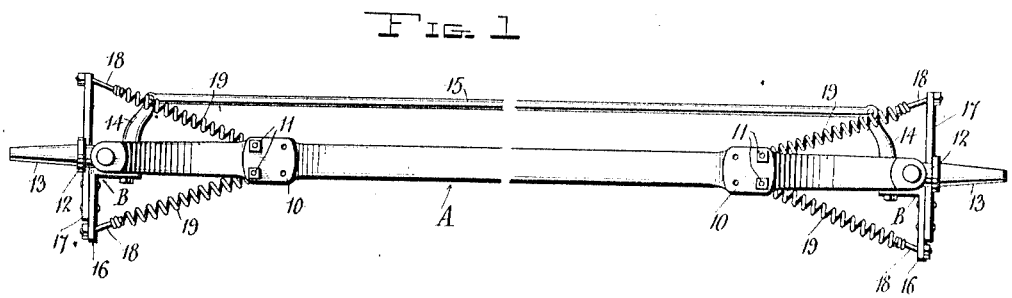
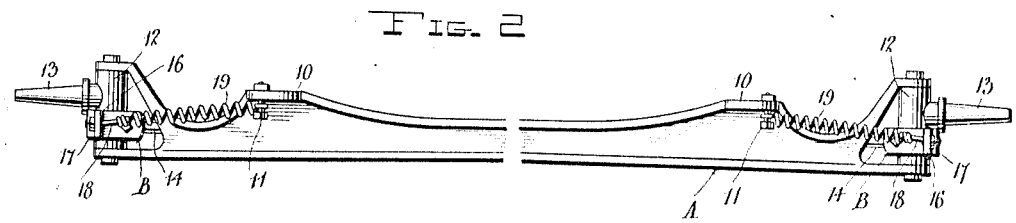
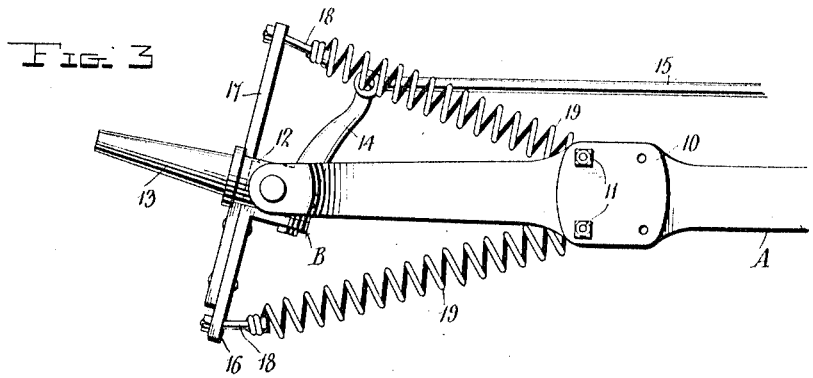
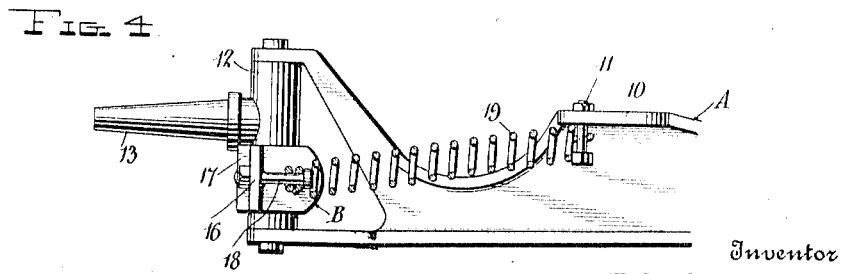
Witnesses
Inventor
J. D. Tower, Jr.
By
Attorney

UNITED STATES PATENT OFFICE.

JUSTUS D. TOWER, JR., OF MENDOTA, ILLINOIS.

ATTACHMENT FOR STEERING-GEAR OF AUTOMOBILES.

1,064,111.  Specification of Letters Patent.  Patented June 10, 1913.

Application filed March 21, 1912. Serial No. 685,318.

*To all whom it may concern:*

Be it known that I, JUSTUS D. TOWER, Jr., a citizen of the United States, residing at Mendota, in the county of Lasalle, State of Illinois, have invented certain new and useful Improvements in Attachments for Steering-Gear of Automobiles; and I do hereby declare the following to be a full, clear, and exact description of the invention, such as will enable others skilled in the art to which it appertains to make and use the same.

This invention relates to attachments for the steering gears of automobiles.

The object of the invention resides in the provision of an attachment for steering gears of automobiles which can be readily associated with any standard steering gear and when so associated will serve to automatically restore the front wheel to alinement with the rear wheel should any part of the steering become broken or disabled thereby insuring a straight ahead movement to the car until same can be conveniently stopped.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a plan view of the forward axle of an automobile showing the invention applied, Fig. 2, a side elevation of what is shown in Fig. 1, Fig. 3, an enlarged plan view of one end of the axle, and Fig. 4, a side view of what is shown in Fig. 3 partly in section.

Referring to the drawings A indicates the forward axle of an automobile which is provided at corresponding points on opposite sides of its center with the usual frame seats 10 and to which latter the frame of the automobile is adapted to be secured by means of bolts 11. The axle A is forked at each end and journaled between the arms of each forked end is a steering knuckle 12. Projecting from each knuckle 12 is the usual journal box 13 and steering knuckle arms 14, and the respective steering knuckle arms 14 are connected together by a rod 15 which is in turn adapted to be connected with the steering column (not shown) in the usual and well known manner. Secured to the front side of each knuckle 12 is an angle bracket B, an arm 16 of which extends forwardly of the axle transversely of the journal box 13 and is disposed parallel to the plane of movement of said knuckle. Secured to the arm 16 contiguous therewith is a bar 17, one end of said bar projecting rearwardly of the axle. Mounted in the free end of the arm 16 and in the end of the bar 17 disposed rearwardly of the axle are bolts 18 to the heads of which are secured corresponding ends of coil springs 19 respectively. The connection between the springs 19 and bolts 11 is such that said bolts are capable of sliding longitudinally within respective springs. The other corresponding ends of the coil springs 19 are suitably secured to the under face of the adjacent seat 10 on opposite sides of the axle A respectively by the bolts 11. It will be noted that certain of these bolts 11 thus perform the double function of securing the automobile frame to the axle A and anchoring the inner ends of the spring 19 to respective seats 10.

By this construction it will be apparent that the tension of the springs 19 balances each other so as to hold the journal box 13 at each end of the axle in alinement with the latter. As the knuckles 12 are swung in the operation of steering however, the tension of certain of the springs 19 will be increased so that in case the steering gear should break the springs 19 under increased tension will automatically swing the knuckles 12 until the journal boxes of respective knuckles have alined longitudinally with the axle A which will insure straight ahead running of the car until the latter can be conveniently stopped.

What is claimed is:

An automatic safety attachment for steering knuckles for automobiles, comprising an angle iron having one portion thereof provided with an opening adjacent its end, and adapted to be secured to the side of the knuckle by the stem of the steering arm, upon which the apertured portion of the angle iron is engaged and clamped, the other portion of the angle iron extending forwardly, a plate carried by the forwardly extending portion and extending rearwardly and adapted to lie against the spindle of the knuckle, and springs having their ends attached to the forwardly and rearwardly extending portions of the irons adjacent their outer ends, the other ends of the springs being adapted for attachment to the securing bolts of the supporting springs of the automobile.

In testimony whereof, I affix my signature, in presence of two witnesses.

JUSTUS D. TOWER, Jr.

Witnesses:
F. L. TOWER,
JOHN A. LAMBERTON.